(12) United States Patent
Sampath et al.

(10) Patent No.: US 10,165,591 B2
(45) Date of Patent: **\*Dec. 25, 2018**

(54) MULTI-USER MULTIPLE INPUT MULTIPLE OUTPUT WIRELESS COMMUNICATIONS

(71) Applicant: QUALCOMM Incorporated, San Diego, CA (US)

(72) Inventors: Hemanth Sampath, San Diego, CA (US); Vincent Knowles Jones, IV, Redwood City, CA (US); Maarten Menzo Wentink, Naarden (NL); Santosh P. Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/819,102

(22) Filed: Aug. 5, 2015

(65) Prior Publication Data

US 2015/0341955 A1 Nov. 26, 2015

Related U.S. Application Data

(63) Continuation of application No. 12/692,134, filed on Jan. 22, 2010, now Pat. No. 9,137,815.

(60) Provisional application No. 61/188,000, filed on Jun. 17, 2009.

(51) Int. Cl.
*H04W 72/12* (2009.01)
*H04B 7/0452* (2017.01)
*H04W 52/14* (2009.01)

(52) U.S. Cl.
CPC ...... *H04W 72/1284* (2013.01); *H04B 7/0452* (2013.01); *H04W 52/146* (2013.01); *H04W 72/121* (2013.01)

(58) Field of Classification Search
None
See application file for complete search history.

(56) References Cited

U.S. PATENT DOCUMENTS 5,375,140 A * 12/1994 Bustamante ........... H04B 7/216
370/335
6,192,036 B1 2/2001 Bühler et al.
(Continued)

FOREIGN PATENT DOCUMENTS

CN 1798123 A 7/2006
CN 1902836 A 1/2007
(Continued)

OTHER PUBLICATIONS

International Search Report and Written Opinion—PCT/US2010/038805, International Search Authority—European Patent Office—dated Oct. 19, 2010.

*Primary Examiner* — Steven H Nguyen
(74) *Attorney, Agent, or Firm* — Steven R. Thiel; Patterson & Sheridan

(57) ABSTRACT

Certain aspects of the present disclosure relate to a method for enhanced multi-user multiple input multiple output (MU-MIMO) wireless communications. The proposed method may reduce and/or eliminate stringent frequency and time synchronization requirements for stations (STAs) to participate in a downlink MU-MIMO transaction by utilizing deterministic scheduling.

14 Claims, 12 Drawing Sheets

(56) References Cited

U.S. PATENT DOCUMENTS

| | | | |
|---|---|---|---|
| 2003/0039217 A1* | 2/2003 | Seo | H04W 52/16 370/318 |
| 2003/0092461 A1 | 5/2003 | Moulsley et al. | |
| 2003/0232622 A1* | 12/2003 | Seo | H04W 52/16 455/437 |
| 2005/0002355 A1 | 1/2005 | Takano | |
| 2005/0105589 A1 | 5/2005 | Sung et al. | |
| 2005/0135410 A1 | 6/2005 | Stephens | |
| 2005/0138199 A1 | 6/2005 | Li et al. | |
| 2005/0147023 A1 | 7/2005 | Stephens et al. | |
| 2005/0220145 A1 | 10/2005 | Nishibayashi et al. | |
| 2005/0238016 A1 | 10/2005 | Nishibayashi et al. | |
| 2005/0285719 A1 | 12/2005 | Stephens | |
| 2006/0083160 A1 | 4/2006 | Koo et al. | |
| 2007/0189207 A1 | 8/2007 | Sammour et al. | |
| 2007/0230373 A1 | 10/2007 | Li et al. | |
| 2008/0136459 A1 | 6/2008 | Ha et al. | |
| 2008/0165742 A1* | 7/2008 | Marinier | H04W 72/14 370/332 |
| 2008/0194283 A1* | 8/2008 | Chaponniere | H04W 52/325 455/522 |
| 2008/0220806 A1* | 9/2008 | Shin | H04W 52/08 455/522 |
| 2008/0232490 A1 | 9/2008 | Gross et al. | |
| 2009/0052378 A1* | 2/2009 | Aghili | H04L 1/0081 370/328 |
| 2009/0073904 A1* | 3/2009 | Ranta-aho | H04L 1/1692 370/310 |
| 2009/0111400 A1 | 4/2009 | Kazmi et al. | |
| 2009/0116587 A1* | 5/2009 | Kwasinski | H04L 27/2613 375/340 |
| 2009/0279470 A1 | 11/2009 | Seok | |
| 2010/0009707 A1* | 1/2010 | Porat | H04L 5/0051 455/517 |
| 2010/0027450 A1* | 2/2010 | Montojo | H04L 1/0017 370/311 |
| 2010/0056059 A1* | 3/2010 | Lakshmanan | H04B 7/0452 455/63.1 |
| 2010/0103885 A1 | 4/2010 | Cordeiro et al. | |
| 2010/0208685 A1* | 8/2010 | Kim | H04W 52/245 370/329 |
| 2010/0296459 A1* | 11/2010 | Miki | H04L 1/0028 370/329 |
| 2010/0322166 A1 | 12/2010 | Sampath et al. | |
| 2011/0064013 A1 | 3/2011 | Liu et al. | |
| 2011/0096710 A1 | 4/2011 | Liu et al. | |
| 2011/0096711 A1 | 4/2011 | Liu et al. | |
| 2011/0116435 A1 | 5/2011 | Liu et al. | |
| 2011/0150004 A1 | 6/2011 | Denteneer et al. | |
| 2011/0182277 A1 | 7/2011 | Shapira | |
| 2012/0327885 A1* | 12/2012 | Chung | H04L 1/1614 370/329 |
| 2013/0136042 A1* | 5/2013 | Chan | H04W 52/08 370/310 |
| 2015/0049682 A1* | 2/2015 | Seo | H04W 52/146 370/329 |

FOREIGN PATENT DOCUMENTS

| | | |
|---|---|---|
| CN | 1953350 A | 4/2007 |
| CN | 101299655 A | 11/2008 |
| EP | 1887712 A2 | 2/2008 |
| EP | 1991010 A1 * | 12/2016 |
| JP | 2005318487 A | 11/2005 |
| JP | 2006115520 A | 4/2006 |
| JP | 2007214920 A | 8/2007 |
| JP | 2008510381 A | 4/2008 |
| JP | 2009060596 A | 3/2009 |
| JP | 2010538514 A | 12/2010 |
| KR | 20060033605 A | 4/2006 |
| WO | 2005015844 A1 | 2/2005 |
| WO | 2006020568 A1 | 2/2006 |
| WO | 2007074452 A2 | 7/2007 |
| WO | WO-2008013459 A2 | 1/2008 |
| WO | 2009027931 A2 | 3/2009 |
| WO | WO-2009029511 A1 | 3/2009 |

\* cited by examiner

MULTI-USER MULTIPLE INPUT MULTIPLE OUTPUT WIRELESS COMMUNICATIONS

CLAIM OF PRIORITY UNDER 35 U.S.C. § 119

The present application for Patent is a Continuation and claims priority to patent application Ser. No. 12/692,134 entitled "Multi-User Multiple Input Multiple output Wireless Communications" filed Jan. 22, 2010, now allowed, which is a Non-Provisional of Application No. 61/188,000 entitled "Multi-User Multiple Input Multiple output Wireless Communications" filed Jun. 17, 2009, and assigned to the assignee hereof and hereby expressly incorporated by reference herein.

TECHNICAL FIELD

Certain aspects of the present disclosure generally relate to wireless communications and, more particularly, to transmitting data to a plurality of wireless stations.

BACKGROUND

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $NS<=\min\{N_T,N_R\}$. The $N_S$ spatial streams may be used to transmit $N_S$ independent data streams to achieve greater overall throughput.

In wireless networks with a single access point and multiple stations, concurrent transmissions may occur on multiple channels toward different stations, both in the uplink and downlink directions. Many challenges are presented in such systems.

SUMMARY

Certain aspects provide a method for wireless communications. The method generally includes transmitting a request message to a plurality of apparatuses, the request message comprising scheduling information indicating when each of the apparatuses should transmit a message in response to the request message, receiving one or more response messages from the apparatuses transmitted according to the scheduling information, computing transmission information based at least on the response messages, and transmitting data simultaneously to the apparatuses using the computed transmission information.

Certain aspects provide a method for wireless communications. The method generally includes receiving a request message from an apparatus, the request message comprising scheduling information indicating when each of a plurality of apparatuses should transmit a message in response to the request message, transmitting the response message to the apparatus according to the scheduling information, and receiving data from the apparatus, the received data being part of data that was transmitted simultaneously from the apparatus to the plurality of apparatuses.

Certain aspects provide an apparatus for wireless communications. The apparatus generally includes a transmitter configured to transmit a request message to a plurality of apparatuses, the request message comprising scheduling information indicating when each of the apparatuses should transmit a message in response to the request message, a receiver configured to receive one or more response messages from the apparatuses transmitted according to the scheduling information, logic configured to compute transmission information based at least on the response messages, and the transmitter further configured to transmit data simultaneously to the apparatuses using the computed transmission information.

Certain aspects provide an apparatus for wireless communications. The apparatus generally includes a receiver configured to receive a request message from an apparatus, the request message comprising scheduling information indicating when each of a plurality of apparatuses should transmit a message in response to the request message, a transmitter configured to transmit the response message to the apparatus according to the scheduling information, and the receiver further configured to receive data from the apparatus, the received data being part of data that was transmitted simultaneously from the apparatus to the plurality of apparatuses.

Certain aspects provide an apparatus for wireless communications. The apparatus generally includes means for transmitting a request message to a plurality of apparatuses, the request message comprising scheduling information indicating when each of the apparatuses should transmit a message in response to the request message, means for receiving one or more response messages from the apparatuses transmitted according to the scheduling information, means for computing transmission information based at least on the response messages, and means for transmitting data simultaneously to the apparatuses using the computed transmission information.

Certain aspects provide an apparatus for wireless communications. The apparatus generally includes means for receiving a request message from an apparatus, the request message comprising scheduling information indicating when each of a plurality of apparatuses should transmit a message in response to the request message, and receiving data from the apparatus, the received data being part of data that was transmitted simultaneously from the apparatus to the plurality of apparatuses, and means for transmitting the response message to the apparatus according to the scheduling information.

Certain aspects provide an access point for wireless communications. The access point generally includes a plurality of antennas, a transmitter configured to transmit, via the plurality of antennas, a request message to a plurality of apparatuses, the request message comprising scheduling information indicating when each of the apparatuses should transmit a message in response to the request message, a receiver configured to receive one or more response messages from the apparatuses transmitted according to the scheduling information, logic configured to compute transmission information based at least on the response messages, and the transmitter further configured to transmit data simultaneously to the apparatuses using the computed transmission information.

Certain aspects provide a station for wireless communications. The station generally includes at least one antenna, a receiver configured to receive, via the at least one antenna, a request message from an apparatus, the request message comprising scheduling information indicating when each of a plurality of apparatuses should transmit a message in response to the request message, and receive data from the apparatus, the received data being part of data that was transmitted simultaneously from the apparatus to the plurality of apparatuses, and a transmitter configured to transmit the response message to the apparatus according to the scheduling information.

Certain aspects of the present disclosure provide a computer-program product for wireless communications, comprising a computer-readable medium comprising instructions. The instructions executable for transmitting a request message to a plurality of apparatuses, the request message comprising scheduling information indicating when each of the apparatuses should transmit a message in response to the request message, receiving one or more response messages from the apparatuses transmitted according to the scheduling information, computing transmission information based at least on the response messages, and transmitting data simultaneously to the apparatuses using the computed transmission information.

Certain aspects of the present disclosure provide a computer-program product for wireless communications, comprising a computer-readable medium comprising instructions. The instructions executable for receiving a request message from an apparatus, the request message comprising scheduling information indicating when each of a plurality of apparatuses should transmit a message in response to the request message, transmitting the response message to the apparatus according to the scheduling information, and receiving data from the apparatus, the received data being part of data that was transmitted simultaneously from the apparatus to the plurality of apparatuses.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
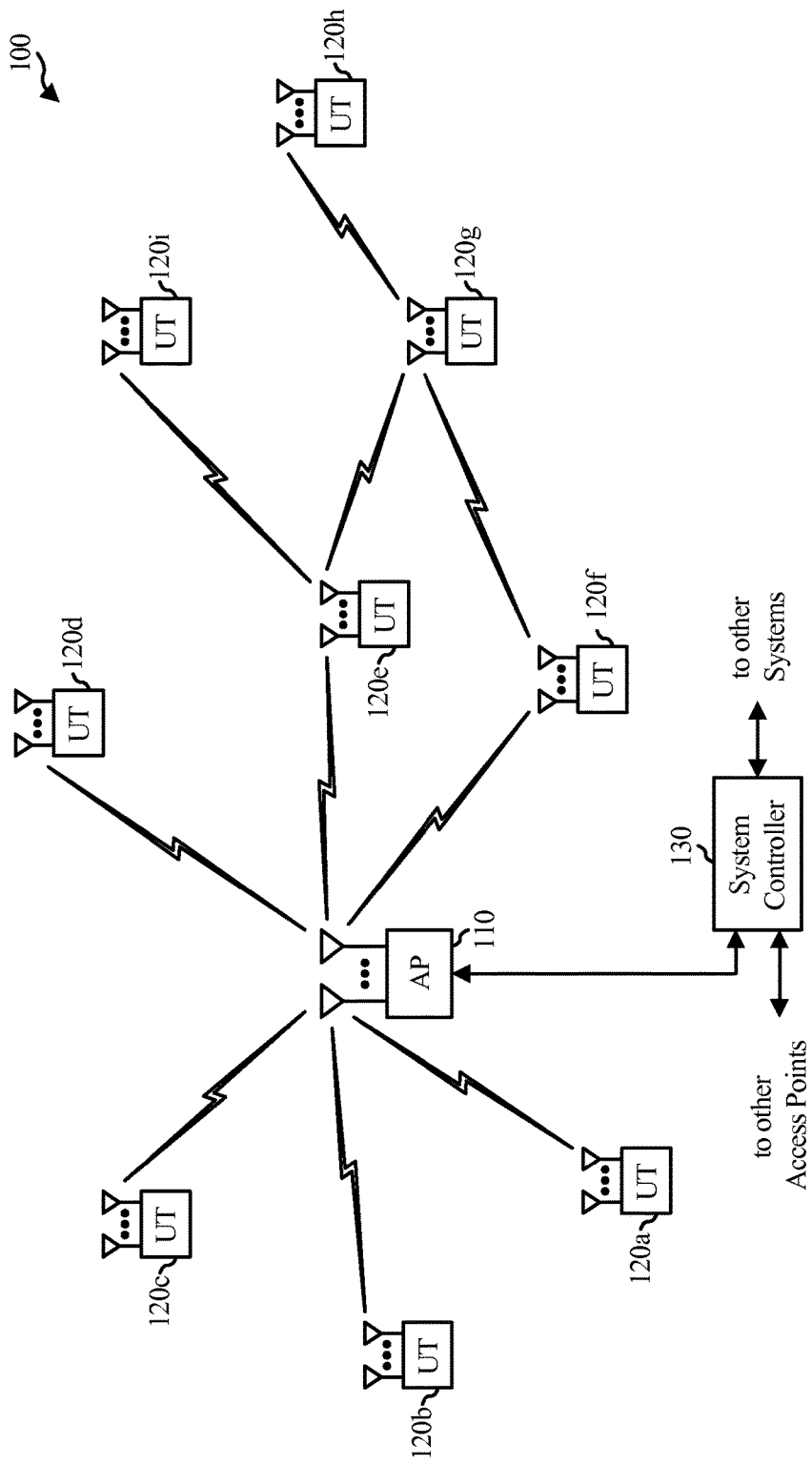
FIG. 1 illustrates a diagram of a wireless communications network, in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
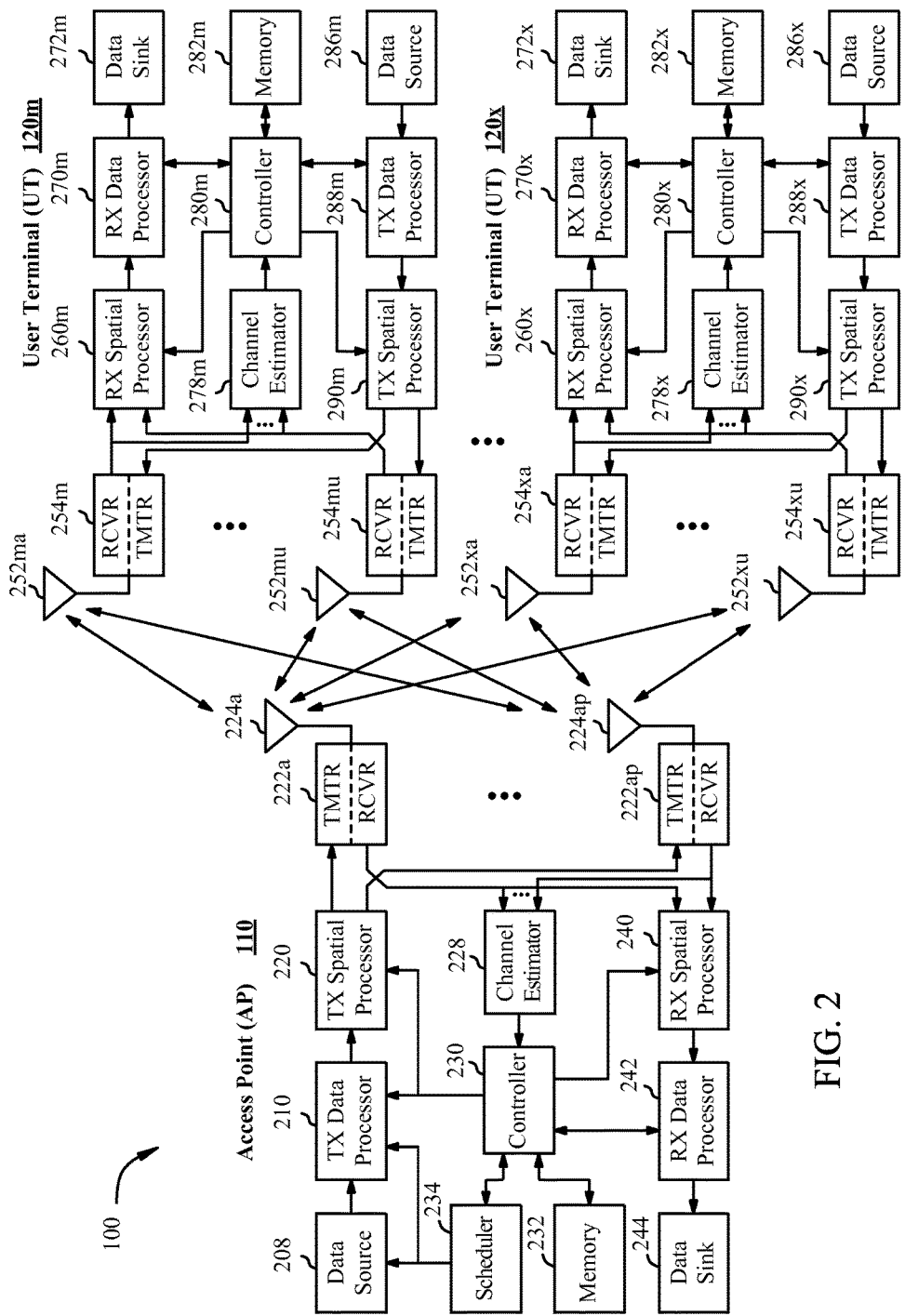
FIG. 2 illustrates a block diagram of an example of signal processing functions of a physical layer of a wireless node in the wireless communications network of FIG. 1, in accordance with certain aspects of the present disclosure.

FIG. 2 shows a block diagram of access point 110 and two user terminals 120*m* and 120*x* in MIMO system 100. Access point 110 is equipped with $N_{ap}$ antennas 224*a* through 224*ap*. User terminal 120*m* is equipped with $N_{ut,m}$ antennas 252*ma* through 252*mu*, and user terminal 120*x* is equipped with $N_{ut,x}$ antennas 252*xa* through 252*xu*. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224*a* through 224*ap* receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR)

222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
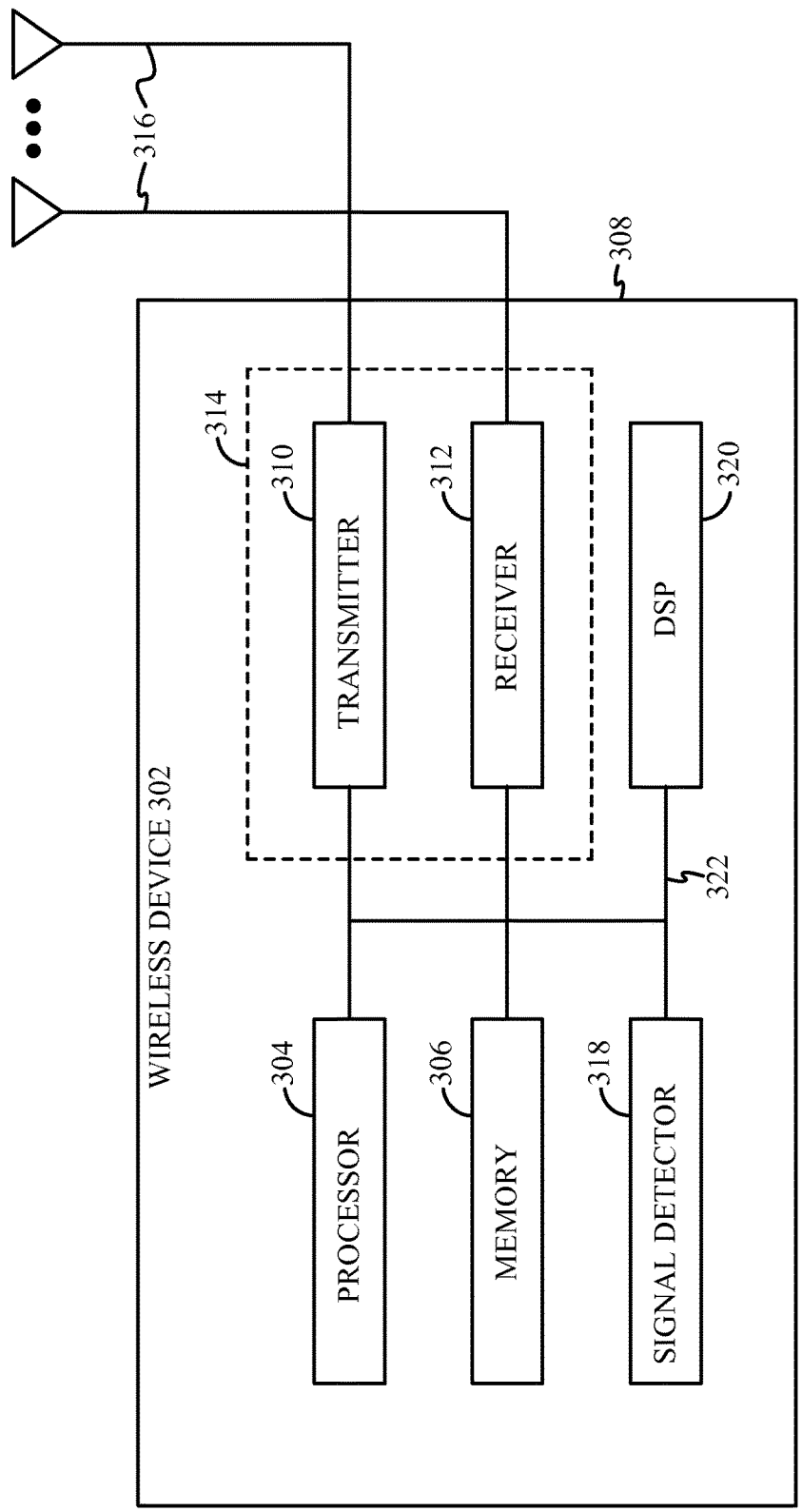
FIG. 3 illustrates a block diagram of an exemplary hardware configuration for a processing system in a wireless node in the wireless communications network of FIG. 1, in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA and combinations thereof.

Downlink Multi-User MIMO

In order to transmit data to a plurality of stations (STAs) using multi-user multiple input multiple output (MU-MIMO), an access point (AP) may need to obtain channel information from the STAs. In addition, the AP may also need to receive a block acknowledgment (BA) from each STA to confirm receipt of data. However, certain STAs may not be equipped with the necessary complexity (e.g., with respect to time and frequency synchronization) required to send uplink channel sounding frames, as well as BAs, to the AP simultaneously (in parallel with other STAs) using MU-MIMO.

Certain aspects of the present disclosure provide a protocol that may reduce and/or eliminate stringent frequency and time synchronization requirements for STAs to participate in a downlink MU-MIMO transaction. According to certain aspects, deterministic scheduling by the AP may allow STAs to participate in MU-MIMO transactions without the need for frequency/timing synchronization required to communicate in MU-MIMO on uplink transactions, to reduce the complexity of the system relative to conventional multi-user communications techniques.

According to certain aspects, modified BAs may be utilized that have certain fields eliminated relative to the conventional BAs. For example, certain deterministic BA scheduling algorithms may allow an AP to recognize which STA is sending a BA even if a source address is eliminated from the BA, which may reduce the size of the BA and help conserve system bandwidth.

Figure 4:
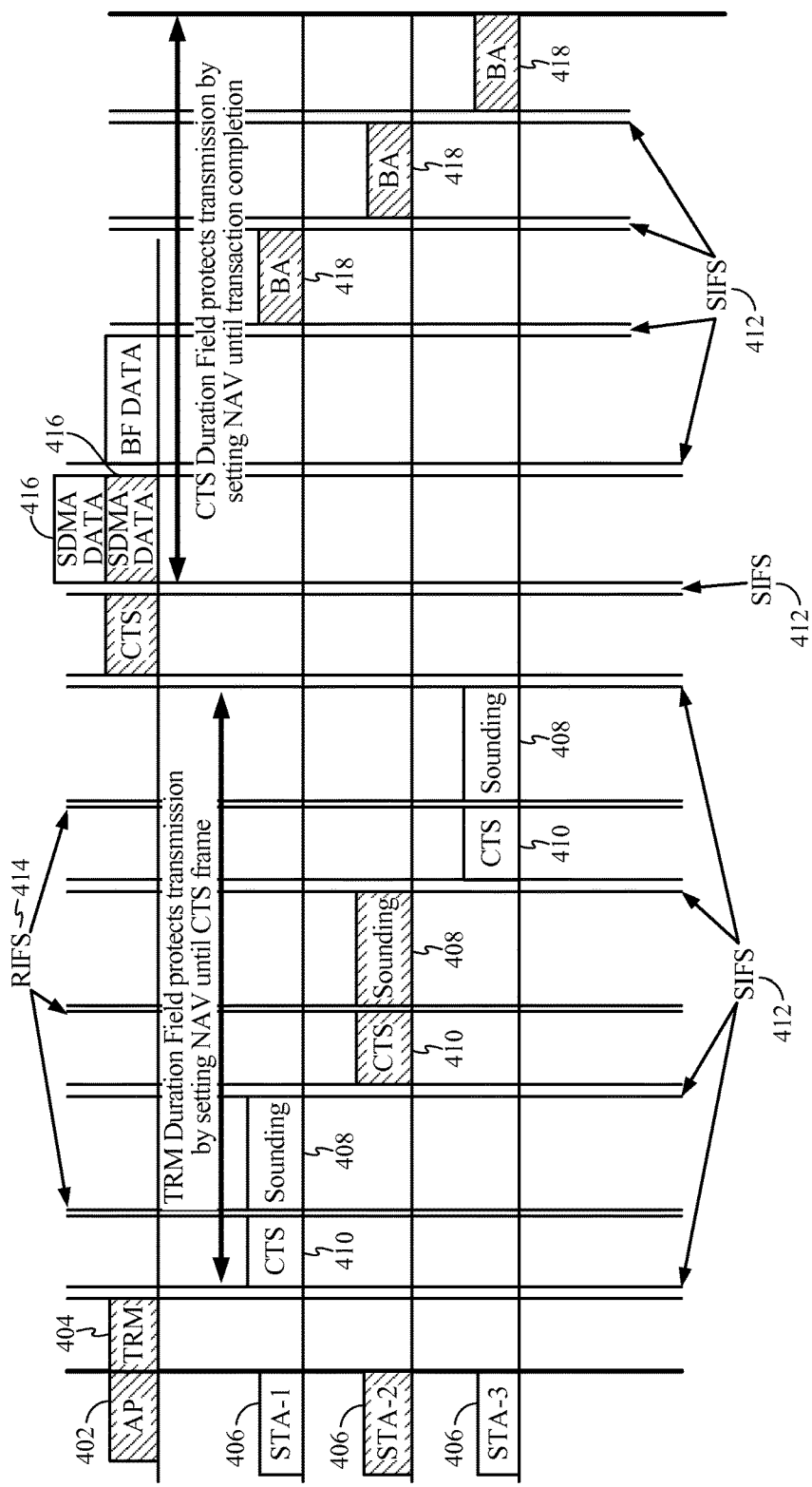
FIG. 4 illustrates example exchange of message frames for multiuser multiple input multiple output (MU-MIMO) communications in which block acknowledgements (BAs) are transmitted in a staggered manner, in accordance with certain aspects of the present disclosure.

FIG. 4 illustrates an example protocol message exchange for multiuser multiple input multiple output (MU-MIMO) communications with block acknowledgements (BAs) transmitted in a staggered manner, in accordance with certain aspects of the present disclosure. The protocol begins with the AP 402 requesting a plurality of STAs 406 to send uplink sounding frames. For example, the sounding frame may include channel sounding frames, channel quality indicator (CQI) or request information. The AP may obtain the medium by performing an enhanced distributed channel access (EDCA)-based back-off procedure (described in the IEEE 802.11 standard) prior to initiating the illustrated transactions. It should be noted that the proposed protocol does not require time-frequency synchronization at the STAs.

As illustrated, the AP 402 may send a Training Request Message (TRM, 404) identifying the STAs 406 and provide scheduling information including scheduled transmission time for sending the sounding frames 408 by each of the STAs. The TRM may also include number of spatial streams assigned to each STA. The AP may request sounding frames from all the STAs or only a subset of the STAs at any transaction. For example, in a system having a plurality of STAs, the AP may send scheduling information indicating when a subset of the STAs should transmit sounding frames. The AP may determine which STAs are in the subset, for example, based on when channel state information (CSI)

was last gathered. STAs with least current CSI (i.e., an out-dated CSI) may be included in the subset.

For certain aspects, the AP may partition the STA transmissions into separate physical layer convergence protocol (PLCP) protocol data units (PPDUs) to ensure sufficient power for each STA. The stations that are far from the AP may be served by increasing their link budget through beam forming.

As illustrated in FIG. 4, the individual STAs may send the channel sounding frames in a serial fashion. The sounding frames may also be transmitted simultaneously by the stations to reduce time overhead. According to certain aspects, the sounding frames may be optimized to have only short training fields and long training fields. The AP may determine the joint channel matrix for the plurality of STAs by decoding the individual sounding frames using the principle of channel reversibility and utilizing calibration coefficients. Once the channel matrix is determined, the AP may calculate a precoding matrix to encode the downlink data for each of the individual STAs.

As indicated, a duration field of the TRM 404 may protect subsequent transmissions (e.g., uplink sounding frames 408) by reserving wireless medium for a duration of time. According to certain aspects, additional protection for the STAs may be achieved by having each of the STAs send a clear-to-send (CTS) message 410 prior to the sounding frame 408.

As illustrated in FIG. 4, transmissions may be separated by Inter-Frame Separation durations. For example, transmissions between stations may be separated by Short Inter-Frame Separation (SIFS) durations 412, while transmissions from the same STA may be separated by (even shorter) Reduced Inter-Frame Separations (RIFS) durations 414.

Deterministic Uplink Scheduling

According to certain aspects, the AP may send scheduling information indicating when STAs are to transmit on the uplink. This deterministic scheduling information may take any suitable form that allows the AP to communicate to each STA when that STA should transmit on the uplink.

According to certain aspects, the AP may send scheduling information with the TRM 404 that specifies a specific transmission time (or offset) for each STA. For example, the AP may identify each STA by medium access control identification (MAC ID) and provide a corresponding transmission time specifying when the STA should send a sounding frame.

As an alternative, according to certain aspects, the AP may send "deterministic back-off" times to each STA. For example, the AP may identify each STA by its MAC ID and provide a corresponding back off time for the STA. Each STA may start a back off timer and transmit if/when its back-off timer expires. Each STA may restart its back-off timer upon detecting transmissions from other stations on the medium. As an example, STA1 and STA2 may be sent back off times equal to 5 and 10, respectively. When back off timer of STA1 expires, STA1 may send its sounding frame. STA2 may detect the transmission from STA1 and reset its back-off timer. STA2 may also send its sounding frame after its back-off timer expires.

As an alternative, according to certain aspects, the AP may specify an order for the STAs to transmit their sounding frames. For example, the AP may identify each STA by its MAC ID and provide a corresponding sequence number. Each STA may listen for transmissions from other stations to determine when to send its sounding frame. As an example, STA1 and STA2 may be assigned sequence numbers equal to 1 and 2, respectively. Therefore, STA1 may be the first station to transmit its sounding frame. STA2 may detect the transmission of STA1 and transmit its sounding frame after the transmission from STA1 is completed.

In some environments, a STA may not be able to detect transmissions from other stations, which might prevent the STA from determining when to transmit its sounding frames. According to certain aspects, however, a STA may transmit a request-to-send (RTS) before sending its sounding frame, prompting a CTS message from the AP. The CTS message should be heard by all the STAs, thereby allowing each STA to determine when to transmit, even if the station cannot hear other STAs.

For certain aspects, an AP may send a CTS-to-self message to protect the sounding frames of a subset of the STAs or their data. This technique may result in a more efficient system when the transmissions from STAs that are far from the AP are protected with CTS-to-self.

As illustrated in FIG. 4, after receiving sounding frames, the AP may obtain the joint channel matrix for the plurality of STAs and calculate a precoding matrix to encode the downlink data (spatial division multiple access (SDMA) DATA 416) for each of the individual STAs.

According to certain aspects, once data transmissions are completed, the STAs may send BAs 418 in a serial manner. The order of the serial transmission of the BAs may be specified in BA scheduling information sent with the data through a transmission time specification. As with the sounding frame scheduling information described above, the BA scheduling information may specify, for each STA, a back off time, specific transmission time, or a sequence number.

According to certain aspects, to reduce the overhead of the BA transmissions, a reduced BA format may be used instead of the conventional IEEE 802.11 BA format. Because the AP may schedule when each STA should transmit its BA, the AP can identify the sender of each BA from the time of reception of the BA.

Figure 5:
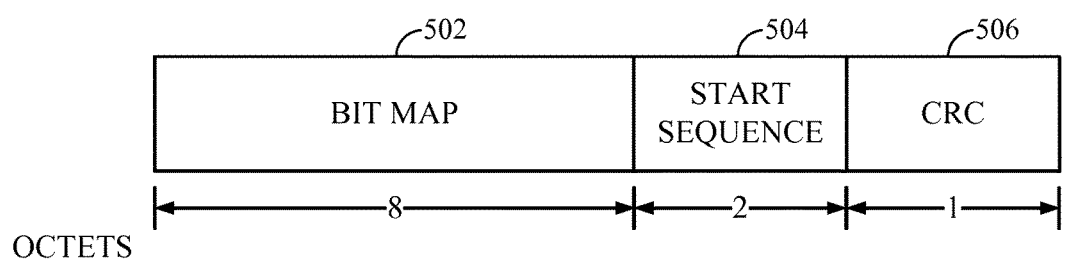
FIG. 5 illustrates an example BA format with reduced size relative to a conventional BA format, in accordance with certain aspects of the present disclosure.

FIG. 5 illustrates an example BA format with reduced size relative to a conventional BA format. For certain aspects, the STA may not include a conventional IEEE 802.11 MAC header in the BA frame and may instead acknowledge receipt of the downlink data in a smaller frame. For example, the BA format illustrated in FIG. 5 may be 11 bytes compared with 32 bytes of a conventional IEEE 802.11 BA frame. The proposed BA frame may include 8 octets for bitmap 502, 2 octets for start sequence and 1 octet for cyclic redundancy check (CRC) 506.

Figure 6:
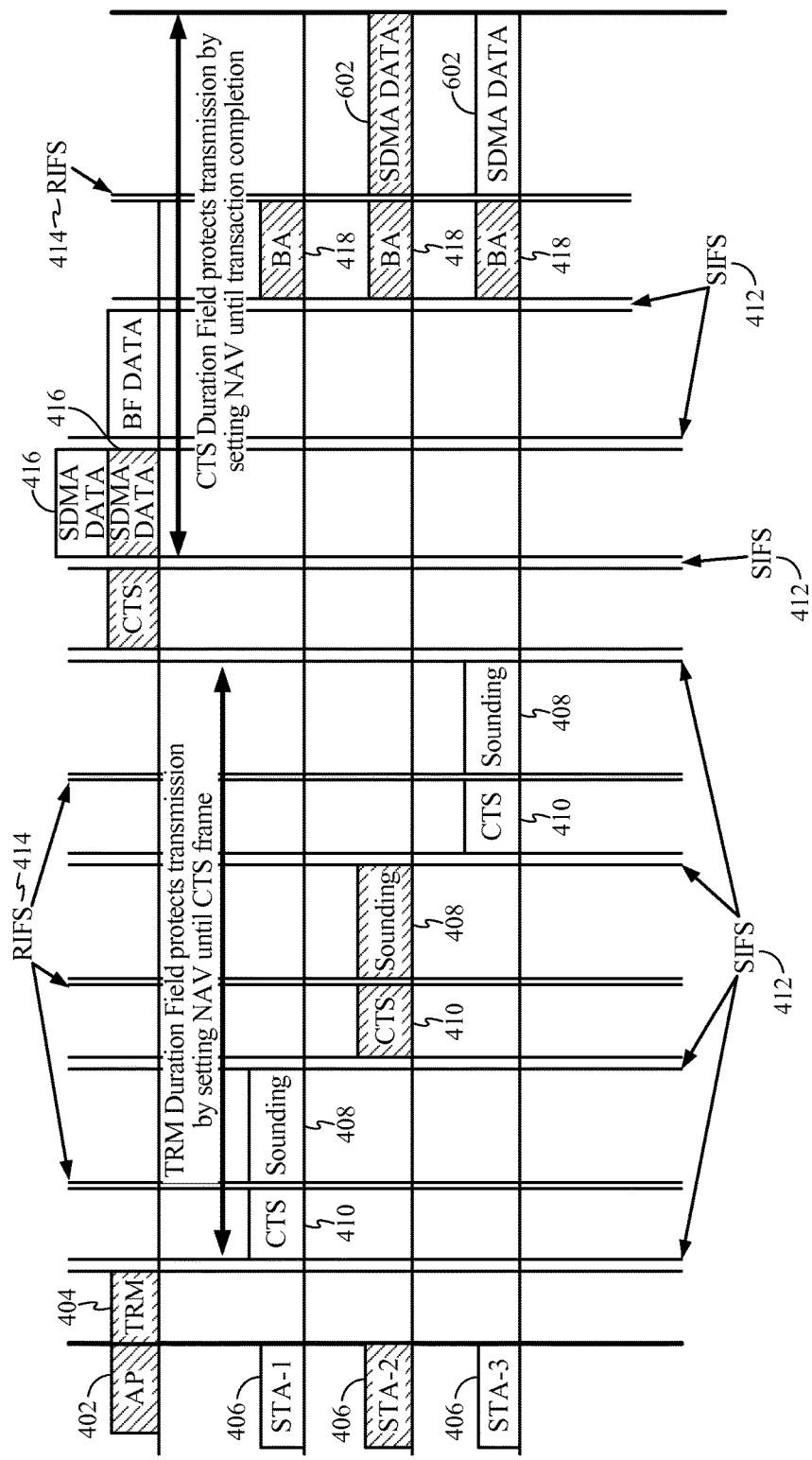
FIG. 6 illustrates example exchange of message frames for MU-MIMO communications in which BAs are transmitted in parallel, in accordance with certain aspects of the present disclosure.

FIG. 6 illustrates example exchange of messages for MU-MIMO communications in which BAs are transmitted in parallel, in accordance with certain aspects of the present disclosure. As illustrated, rather than transmitting BAs in a serial manner that was described in FIG. 4, BAs 418 may be transmitted in parallel using uplink MU-MIMO technique. Various techniques may be utilized to help the STAs meet the time and frequency synchronization requirements to ensure the AP is able to decode the UL MU-MIMO transmissions (SDMA data 602). According to a first technique, the BAs may be sent using symbols with an extended cyclic prefix (CP), thus reducing the synchronization requirement.

According to a second technique, the AP may send UL MU-MIMO information to each STA (e.g., with the downlink data), such as a frequency offset correction measured from the sounding frame from the STA, a time offset or a power offset. The STA may utilize the uplink transmission information to send the uplink BA using MU-MIMO.

Figure 7:
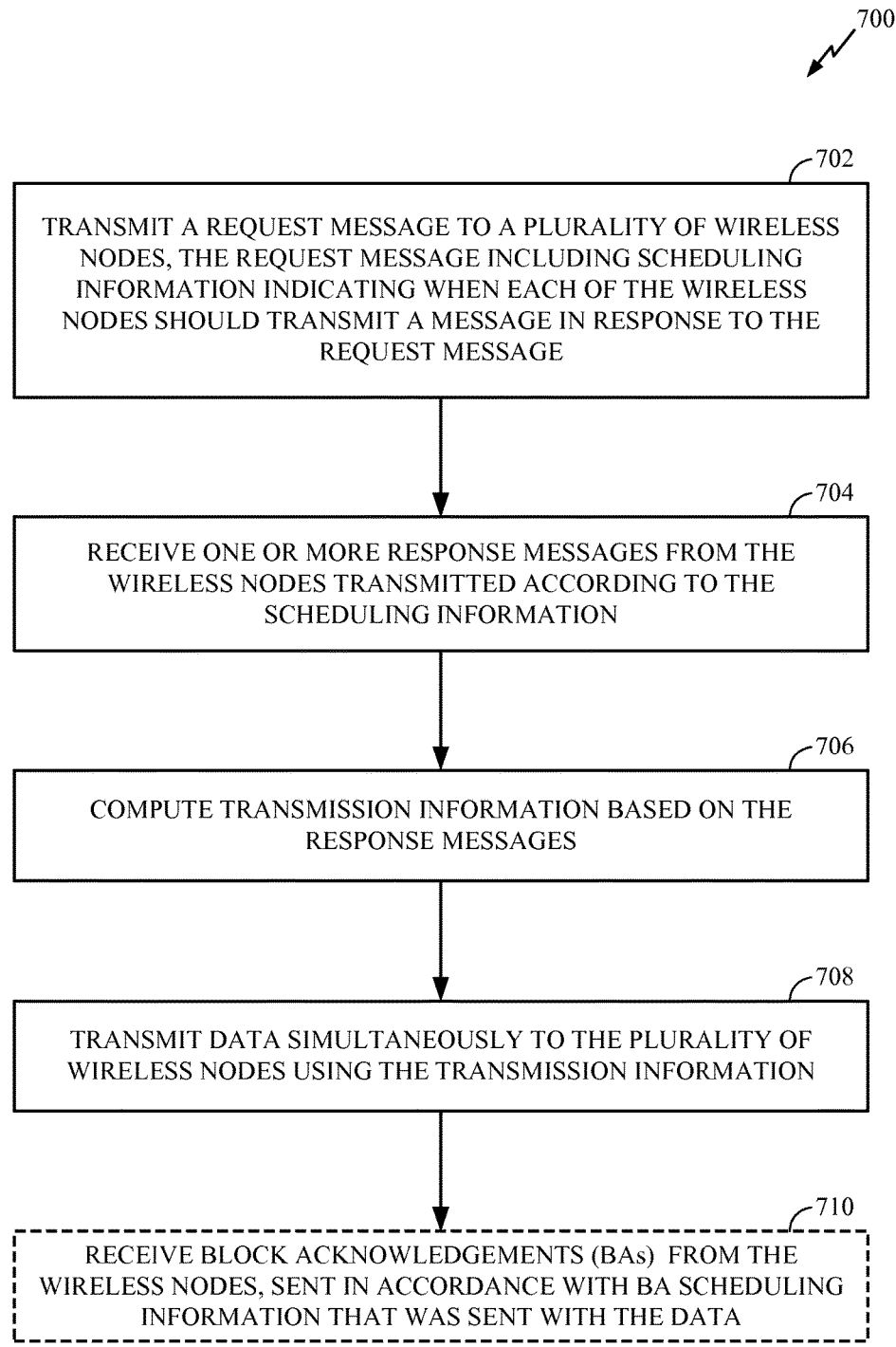
FIG. 7 illustrates example operations that may be performed by an access point for MU-MIMO wireless communications, in accordance with certain aspects of the present disclosure.

FIG. 7 illustrates example operations 700 that may be performed by an AP, for MU-MIMO wireless communications in accordance with the techniques described above. At 702, the AP transmits a request message to a plurality of wireless nodes (e.g., stations), the request message including scheduling information indicating when each of the wireless nodes should transmit messages in response to the request message. For certain aspects, the AP may send a TRM message or a request to send (RTS) message to the stations. The stations may respond to the request message by transmitting a sounding frame or a CTS message.

At 704, the AP receives response messages from the wireless nodes transmitted according to the scheduling information. At 706, the AP computes DL transmission information based at least on the response messages. For example, response message may include sounding frames, or the AP may already have information about the channel conditions of the stations and the response message may only include a CTS. The AP may use all the information available to it to calculate the downlink transmission information. At 708, the AP transmits DL data simultaneously to the plurality of wireless nodes using the DL transmission information. At 710, the AP may receive BAs from STAs, sent in accordance with BA scheduling information that was sent with the data.

Figure 8:
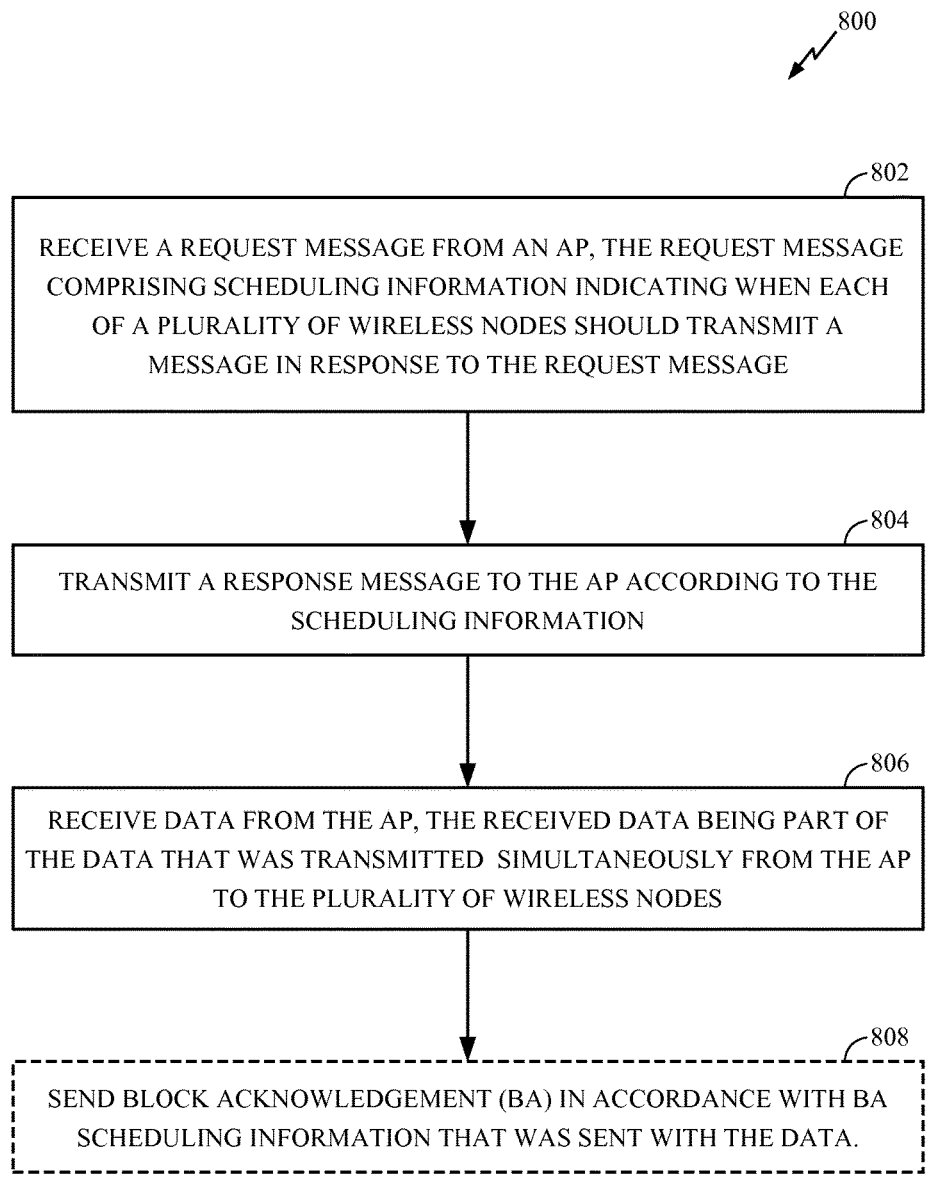
FIG. 8 illustrates example operations that may be performed by a station for MU-MIMO wireless communications, in accordance with certain aspects of the present disclosure.

FIG. 8 illustrates example operations 800 that may be performed by a wireless node for MU-MIMO wireless communications in accordance with the techniques described above. At 802, the wireless node (e.g., a station) receives a request message from an AP, the request message comprising scheduling information indicating when each of a plurality of wireless nodes should transmit messages in response to the request message. For example, the request message may be a TRM, or an RTS message if the channel conditions are known by the AP. The STA may respond with a sounding frame or a CTS to the request message.

At 804, the wireless node transmits a response message to the AP according to the scheduling information. At 806, the STA receives DL data from the AP, the received DL data being part of DL data that was transmitted simultaneously from the AP to the plurality of wireless nodes. The wireless node may also receive UL MU-MIMO and BA scheduling information from the AP. At 808, the wireless node may send BA in accordance with BA scheduling information that was sent with the data.

For certain aspects, the AP may have information about the channel conditions of each of the STAs for which the AP wants to send downlink data. This may happen when the channels between the AP and the STAs change slowly and the AP is able to use the channel state information (CSI) from previous transmissions. Therefore, the access point may ask for CTS messages from the STAs instead of sounding frames.

Figure 9:
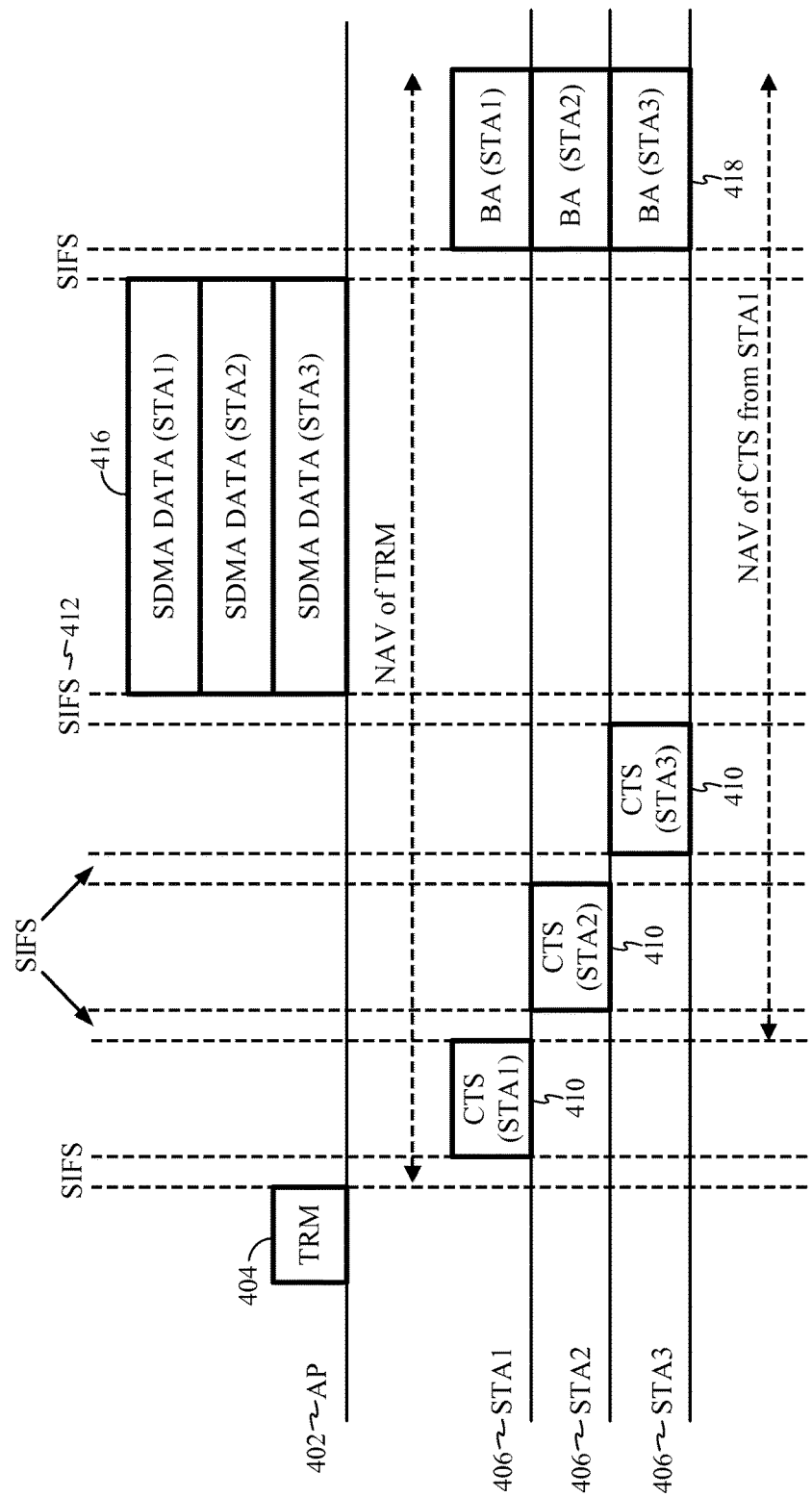
FIG. 9 illustrates an example exchange of messages for MU-MIMO communications, in which the TRM schedules clear to send (CTS) messages, in accordance with certain aspects of the present disclosure.

FIG. 9 illustrates an example exchange of messages for MU-MIMO communications, in which the TRM schedules CTS messages, in accordance with certain aspects of the present disclosure. As illustrated, the AP transmits a TRM 404 message that schedules a sequence of CTS messages 410 from one or more STAs 406 that have downlink data. The AP may send the downlink SDMA data 416 to the stations after receiving the CTS messages 410 from the stations 406.

For certain aspects, the AP may replace a TRM message with a request to send (RTS) message when it needs to obtain only a CTS from one of the STAs. The access point may randomly choose one of the STAs to send the CTS. For certain aspects, the AP may choose the STA to send the CTS based on the location of the STAs. For example, the AP may select the STA that is the farthest from the AP to achieve maximum protection.

Figure 10:
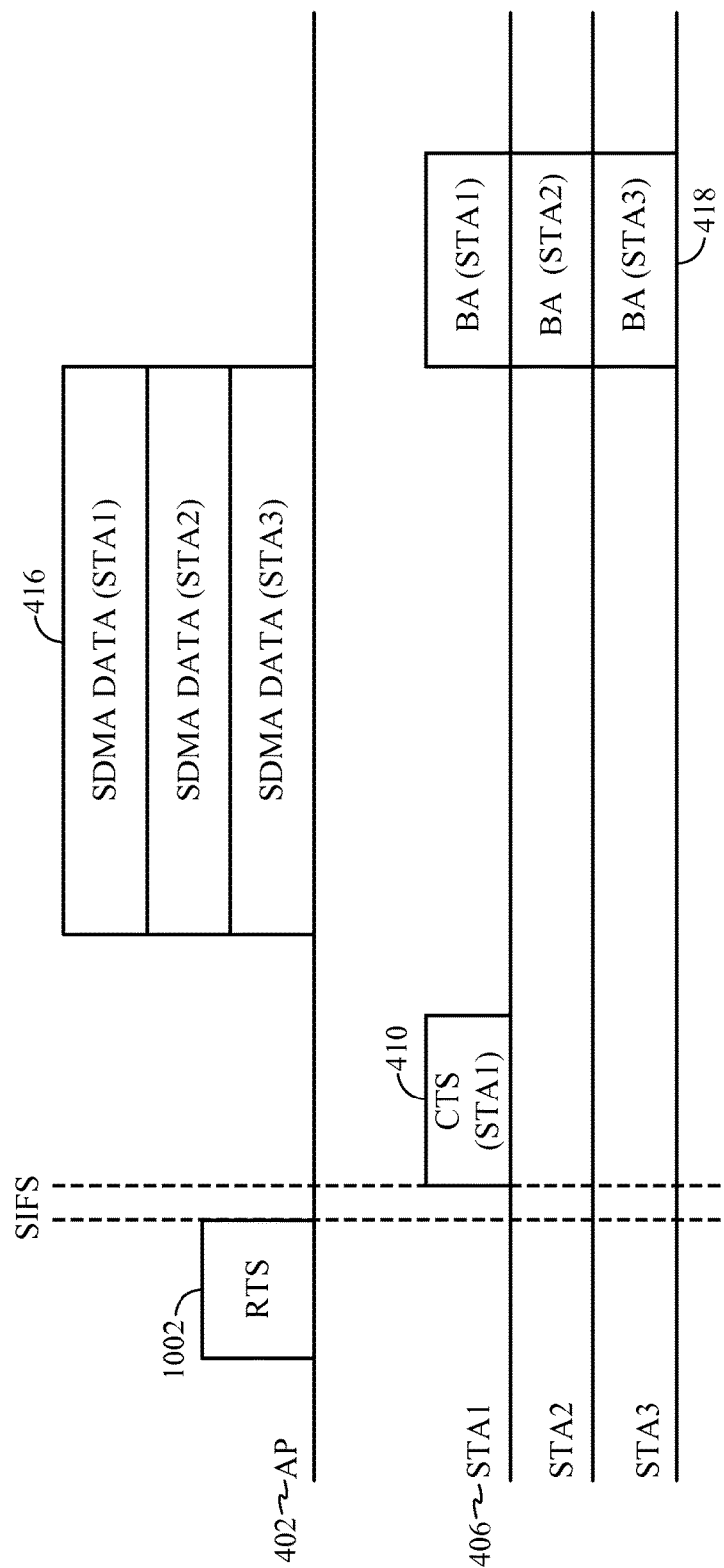
FIG. 10 illustrates an example exchange of messages for MU-MIMO communications, in which a request to send (RTS) message is transmitted to the stations, in accordance with certain aspects of the present disclosure.

FIG. 10 illustrates an example exchange of messages for MU-MIMO communications, in which a request to send (RTS) 1002 message is transmitted to the stations, in accordance with certain aspects of the present disclosure. As illustrated, the AP transmits an RTS message to one or more stations. One of the stations that is chosen by the AP, responds to the RTS by sending a CTS 410 message. After receiving the CTS, the AP may send the downlink SDMA data 416 to the stations 406.

Figure 7A:
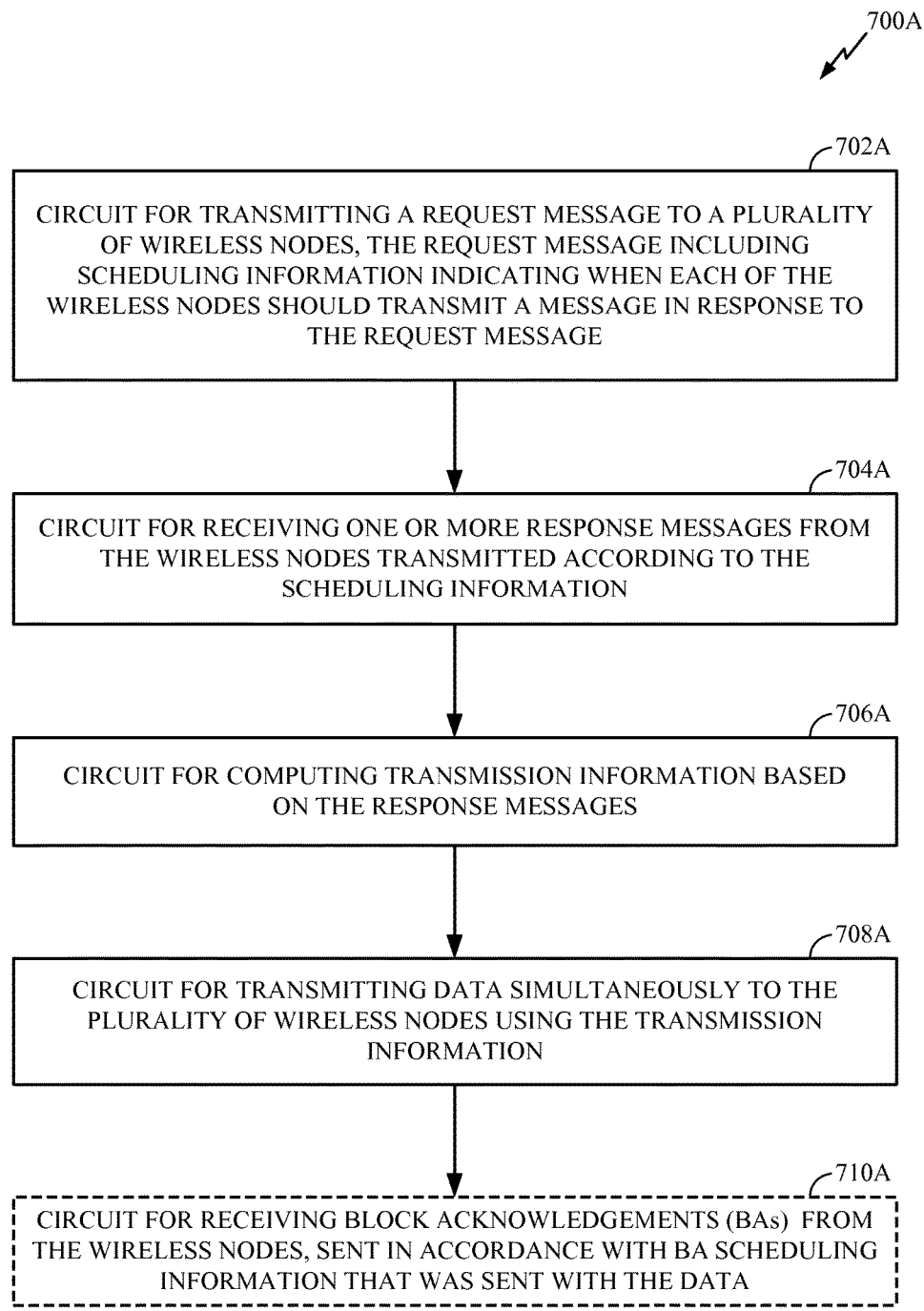
FIG. 7A illustrates example components capable of performing the operations shown in FIG. 7.
Figure 8A:
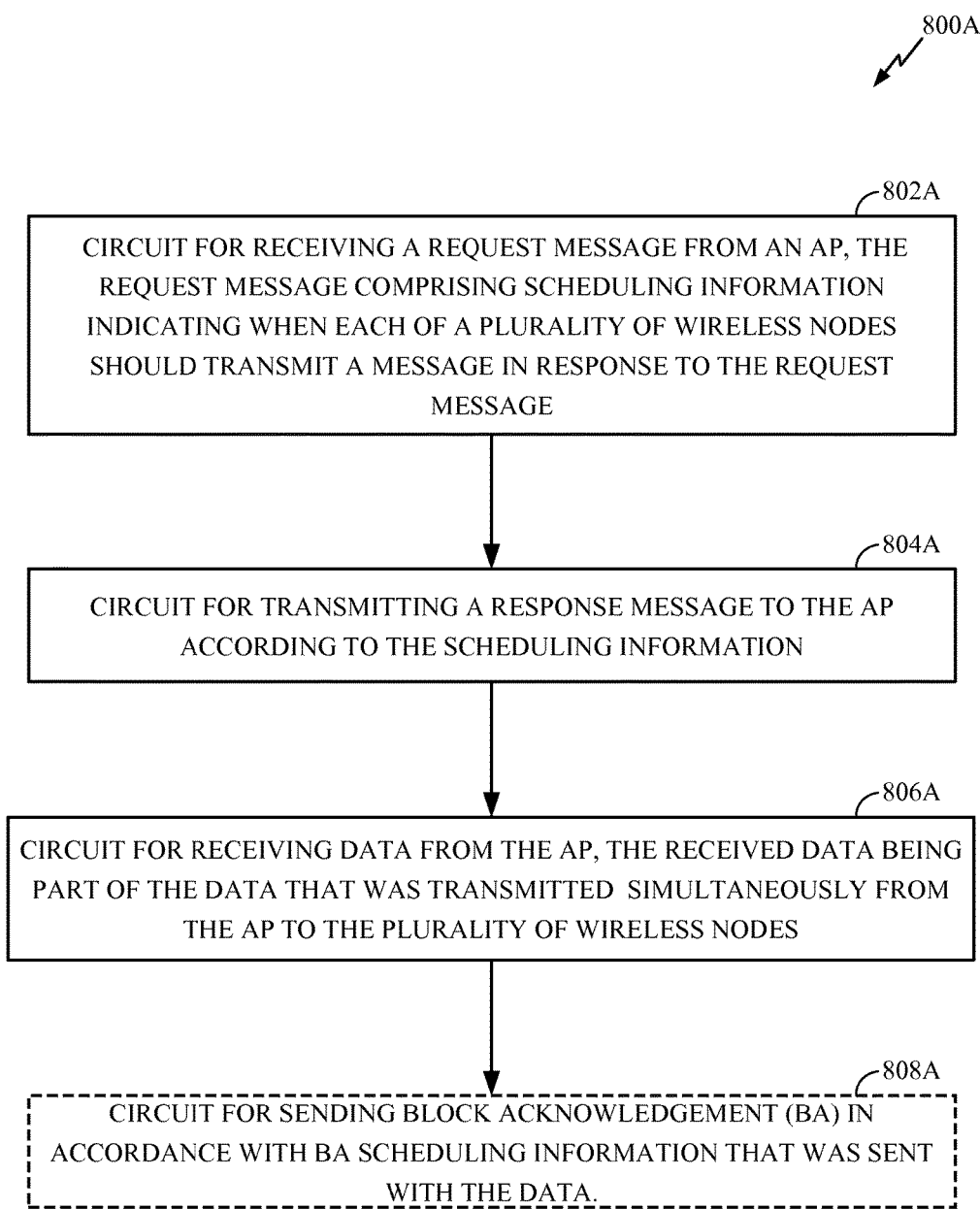
FIG. 8A illustrates example components capable of performing the operations shown in FIG. 8.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 700 and 800 illustrated in FIGS. 7 and 8 may be performed by corresponding means 700A and 800A illustrated in FIGS. 7A and 8A.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of X or Y" is meant to be inclusive of the combination of X and Y. In other words, "at least one of X or Y" includes X, Y, and the combination of X and Y.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
    receiving, at an apparatus of a plurality of apparatuses, uplink transmission information, wherein the uplink transmission information comprises a power offset for the apparatus and uplink multi-user multiple-input multiple-output (MU-MIMO) information associated with the plurality of apparatuses; and
    transmitting, from the apparatus in response to receiving downlink data, an uplink block acknowledgement (BA) based on the power offset and the uplink MU-MIMO information associated with the plurality of apparatuses in the uplink transmission information and using an uplink MU-MIMO transmission scheme.

2. The method of claim 1, wherein receiving the uplink transmission information comprises:
    receiving the uplink transmission information within the downlink data.

3. The method of claim 1, wherein the uplink transmission information further comprises at least one of: a frequency offset correction or a time offset.

4. The method of claim 3, wherein the frequency offset correction is measured from a sounding frame transmitted by the apparatus.

5. An apparatus for wireless communications, comprising:
    a receiver configured to receive uplink transmission information, wherein the uplink transmission information comprises a power offset for the apparatus and uplink multi-user multiple-input multiple-output (MU-MIMO) information associated with a plurality of apparatuses including the apparatus; and
    a transmitter configured to transmit, in response to receiving downlink data, an uplink block acknowledgement (BA) based on the power offset and the uplink MU-MIMO information associated with the plurality of apparatuses in the uplink transmission information and using an uplink MU-MIMO transmission scheme.

6. The apparatus of claim 5, wherein the receiver is further configured to:
    receive the uplink transmission information within the downlink data.

7. The apparatus of claim 5, wherein the uplink transmission information further comprises at least one of: a frequency offset correction or a time offset.

8. The apparatus of claim 7, wherein the frequency offset correction is measured from a sounding frame transmitted by the apparatus.

9. An apparatus for wireless communications, comprising:
- means for receiving uplink transmission information, wherein the uplink transmission information comprises a power offset for the apparatus and uplink multi-user multiple-input multiple-output (MU-MIMO) information associated with a plurality of apparatuses including the apparatus; and
- means for transmitting, in response to receiving downlink data, an uplink block acknowledgement (BA) based on the power offset and the uplink MU-MIMO information associated with the plurality of apparatuses in the uplink transmission information and using an uplink MU-MIMO transmission scheme.

10. The apparatus of claim 9, wherein the means for receiving is further configured to:
- receive the uplink transmission information within the downlink data dedicated to the plurality of apparatuses.

11. The apparatus of claim 9, wherein the uplink transmission information further comprises at least one of: a frequency offset correction or a time offset.

12. The apparatus of claim 11, wherein the frequency offset correction is measured from a sounding frame transmitted by the apparatus.

13. A station for wireless communications, comprising:
- at least one antenna;
- a receiver configured to receive, via the at least one antenna, uplink transmission information, wherein the uplink transmission information comprises a power offset for the station and uplink multi-user multiple-input multiple-output (MU-MIMO) information associated with a plurality of apparatuses including the station; and
- a transmitter configured to transmit, via the at least one antenna in response to receiving downlink data, an uplink block acknowledgement (BA) based on the power offset and the uplink MU-MIMO information associated with the plurality of apparatuses in the uplink transmission information and using an uplink MU-MIMO transmission scheme.

14. A non-transitory computer-readable storage medium encoded with instructions executable for:
- receiving, at an apparatus of a plurality of apparatuses, uplink transmission information, wherein the uplink transmission information comprises a power offset for the apparatus and uplink multi-user multiple-input multiple-output (MU-MIMO) information associated with the plurality of apparatuses; and
- transmitting, from the apparatus in response to receiving downlink data, an uplink block acknowledgement (BA) based on the power offset and the uplink MU-MIMO information associated with the plurality of apparatuses in the uplink transmission information and using an uplink MU-MIMO transmission scheme.

* * * * *